(12) United States Patent
Hojyo et al.

(10) Patent No.: US 6,589,025 B2
(45) Date of Patent: Jul. 8, 2003

(54) OIL PUMP STRUCTURE OF AN ENGINE

(75) Inventors: Atsuo Hojyo, Saitama (JP); Hiroatsu Inui, Saitama (JP); Naoki Kohno, Saitama (JP); Fumiaki Okubo, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 71 days.

(21) Appl. No.: 09/949,711

(22) Filed: Sep. 12, 2001

(65) Prior Publication Data

US 2002/0034449 A1 Mar. 21, 2002

(30) Foreign Application Priority Data

Sep. 12, 2000 (JP) ........................... 2000-277066

(51) Int. Cl.⁷ ............................... F04B 49/00
(52) U.S. Cl. ........................... 417/310; 184/6.5
(58) Field of Search ................ 417/310; 137/538, 137/16.27; 123/196 R, 90.34, 195 R; 440/88; 184/6.5

(56) References Cited

U.S. PATENT DOCUMENTS

| | | | | |
|---|---|---|---|---|
| 4,423,707 A | * | 1/1984 | Sihon et al. | 123/195 R |
| 4,729,349 A | * | 3/1988 | Sonoda et al. | 123/90.34 |
| 4,834,219 A | * | 5/1989 | Inagaki et al. | 184/6.5 |
| 4,971,528 A | * | 11/1990 | Hodgkins et al. | 417/310 |
| 5,435,334 A | | 7/1995 | Inukai et al. | |
| 6,267,566 B1 | * | 7/2001 | Konishi et al. | 417/310 |
| 6,305,342 B1 | * | 10/2001 | Narita et al. | 123/196 R |
| 6,352,085 B1 | * | 3/2002 | Morita et al. | 137/16.27 |
| 6,460,503 B2 | * | 10/2002 | Kimoshita et al. | 123/196 R |
| 6,481,458 B2 | * | 11/2002 | Hirano et al. | 137/538 |
| 2001/0025742 A1 | * | 10/2001 | Ohyama et al. | 184/6.5 |
| 2002/0000344 A1 | * | 1/2002 | Takada et al. | 184/6.5 |
| 2002/0160670 A1 | * | 10/2002 | Berthiaume | 440/88 |

FOREIGN PATENT DOCUMENTS

| | | | | |
|---|---|---|---|---|
| DE | 43 42 784 C2 | | 6/1994 | |
| JP | 403107592 | * | 5/1991 | ........... F04C/15/04 |
| JP | B2788820 | | 9/1995 | |
| JP | 9-88538 | | 3/1997 | |
| JP | B2-2688926 | | 8/1997 | |
| JP | 3275653 | * | 4/2002 | ........... F01M/1/16 |

* cited by examiner

*Primary Examiner*—Teresa Walberg
*Assistant Examiner*—Leonid M Fastovsky
(74) *Attorney, Agent, or Firm*—Birch, Stewart, Kolasch & Birch, LLP

(57) ABSTRACT

An oil pump is formed by a main body portion, a base, and a pump cover, and is provided with a rotor rotational shaft. The oil pump is formed with a main pump and a sub pump. The oil pump is attached to bond with a wall face of a thick-walled portion of a crankcase. A relief valve chamber is provided in the thick-walled portion in parallel with the rotor rotational shaft. A relief valve is contained therein in parallel with the rotor rotational shaft. A surrounding space in the relief valve chamber is directly connected to a pumping portion of the oil pump. This combination of elements and configuration provides for an oil pump that operates with efficiency, and that is small in size, light in weight.

14 Claims, 5 Drawing Sheets

OIL PUMP STRUCTURE OF AN ENGINE

BACKGROUND OF THE INVENTION

1. Field of the Invention

The present invention relates to an oil pump structure for supplying lubricating oil to an engine.

2. Description of Background Art

Japanese Patent No. 2688926 shows an oil pump structure in which lubricating oil in an oil pan is delivered from a scavenging pump to an oil tank, and the lubricating oil in the oil tank is supplied to respective portions of an engine by a feed pump. A relief valve is provided between respective delivery paths of the feed pump and the scavenging pump, and when delivery pressure on the side of the feed pump becomes higher than a predetermined value, the relief valve is opened and a lubricating oil escapes to the side of the delivery path of the scavenging pump.

Further, Japanese Examined Patent Publication No. 88820/1995 shows an oil pump structure in which a relief valve chamber extends in a direction orthogonal to a rotor rotational shaft and is provided integrally with a cover of an oil pump. In this structure, a relief path is formed in a circular arc shape at a face of bonding the cover and a main body portion of the oil pump enabling the lubricating oil escaping from the relief valve chamber to return to an intake side of the oil pump.

As described in Japanese Patent No. 2688926, when the lubricating oil that reaches a predetermined high pressure and escapes from the relief valve to the oil tank on the low pressure side, it is necessary to circulate the lubricating oil by taking in the lubricating oil by the feed pump from the oil tank. Thus, pump efficiency is lowered.

In Japanese Examined Patent Publication No. 88820/1995, the relief valve chamber is formed integrally with the cover of the oil pump, resulting in a cover and a total pump structure that is large and relatively heavy in weight. Further in this structure, the relief path is comparatively long, and is formed in a direction orthogonal to the axis of the rotor rotational shaft and the axis of the crankshaft. Thus, when the oil pump, as described in the reference, is attached to the inside of the crankcase, the relief valve chamber projects into an inner space of the crankcase, and a comparatively large space is needed for its layout in order to avoid interference with other parts.

Hence, it is an object of the present invention to provide an oil pump that is efficient to operate, small in size, light in weight, and also affords excellent space efficiency.

SUMMARY AND OBJECTS OF THE INVENTION

In order to improve upon the designs shown in prior art, the present invention provides an oil pump structure of an engine characterized in that an engine is attached with an oil pump for taking in a lubricating oil from an oil pan and pressurizing the lubricating oil to supply to respective portions of the engine by bonding the oil pump to a crankcase. The present invention also provides a relief valve for adjusting a delivery pressure that is contained in a relief valve chamber formed over a face of bonding the crankcase and the oil pump in parallel with a rotor rotational shaft of the oil pump, and, in addition provides a relief path from the relief valve that is formed by directly connecting the relief valve chamber and an intake chamber of the oil pump contiguous thereto.

According to the present invention, the relief valve chamber is formed to cross over the crankcase and the oil pump, the relief valve is contained in parallel with the rotor rotational shaft, and therefore, the relief valve chamber can be formed by utilizing the inside of wall thickness of the crankcase. As compared to conventional structures, the present invention affords excellent space efficiency. Further, by bonding the oil pump to the crankcase, the relief valve can be interposed conveniently in a small space between the crankcase and the oil pump. Further, the relief valve chamber is directly connected to the intake side of the oil pump contiguous thereto, resulting in a relief path that is relatively short, and a total oil pump structure that is small in size, light in weight, and that has excellent pumping efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
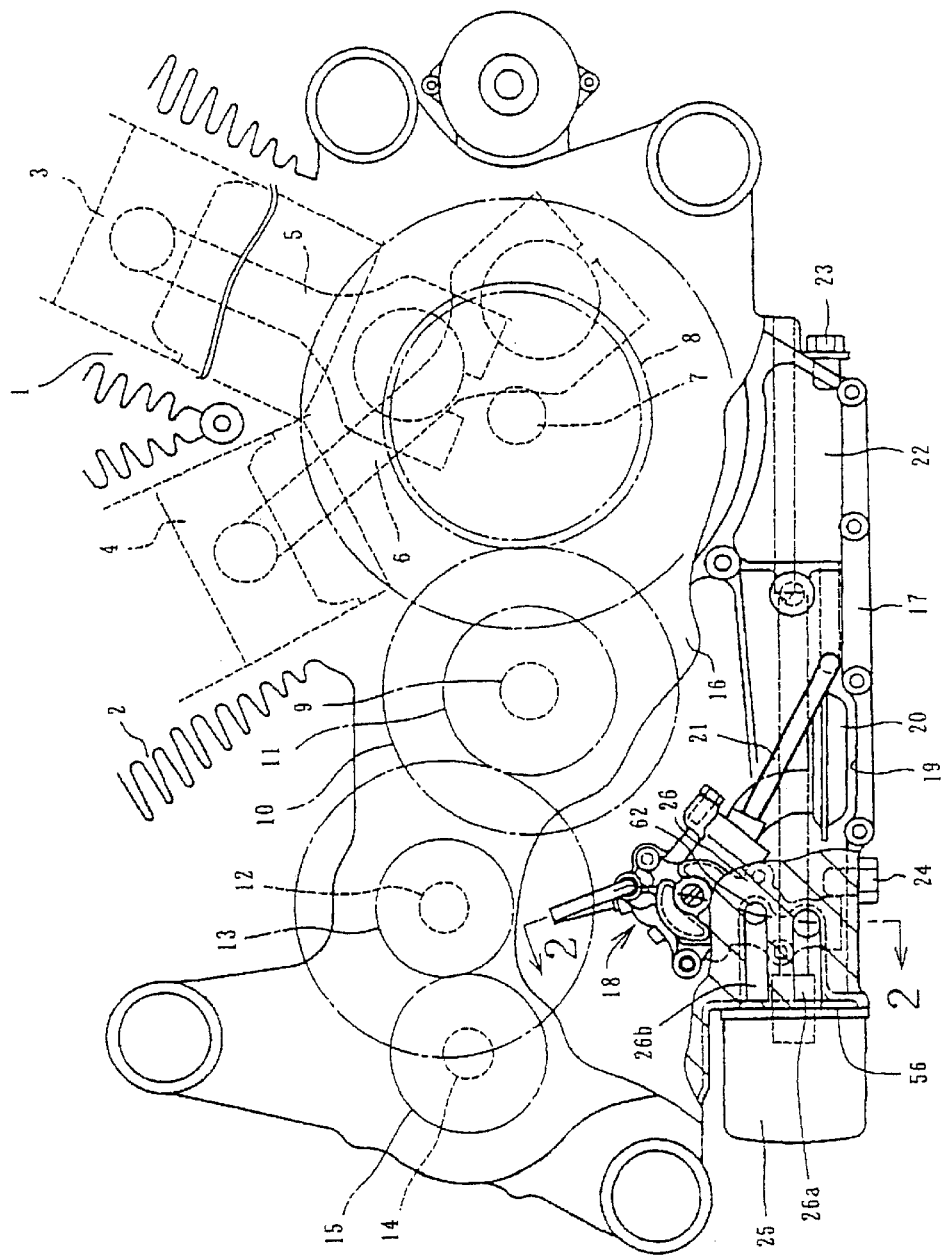
FIG. 1 is a side view showing a partial cut-away view of an engine.

As illustrated in FIG. 1, the engine is a V-type engine having a first cylinder 1 and a second cylinder 2. Pistons 3, 4 together with connecting rods 5, 6, a crankshaft 7, a primary gear 8, an intermediate shaft 9, an intermediate shaft driven gear 10, an intermediate shaft drive gear 11, a main shaft constituting a transmission input shaft 12, a main gear train 13, a counter shaft 14 and a counter gear train 15 form the working components of the engine. It should be noted that shafts 7, 9, and 12 are illustrated in FIG. 1 merely to indicate their center positions, and not to represent their actual thicknesses. Similarly, the representations of the main gear train and the counter gear train in FIG. 1 are intended to merely express how these two gear trains mesh with each other.

An oil pan 17 is provided at a bottom portion of a crankcase 16, an oil pump 18 is arranged on a lower side of the main shaft 12 and lubricating oil is pumped through a strainer 20 placed at a bottom portion 19 of the oil pan 17. The lubricating oil is pumped also from a front small chamber 22 formed on a lower side of the crankshaft 7 by a suction tube 21. Drain bolts 23, 24 and an oil filter 25 are provided for mounting the device and filtering the oil.

Figure 2:
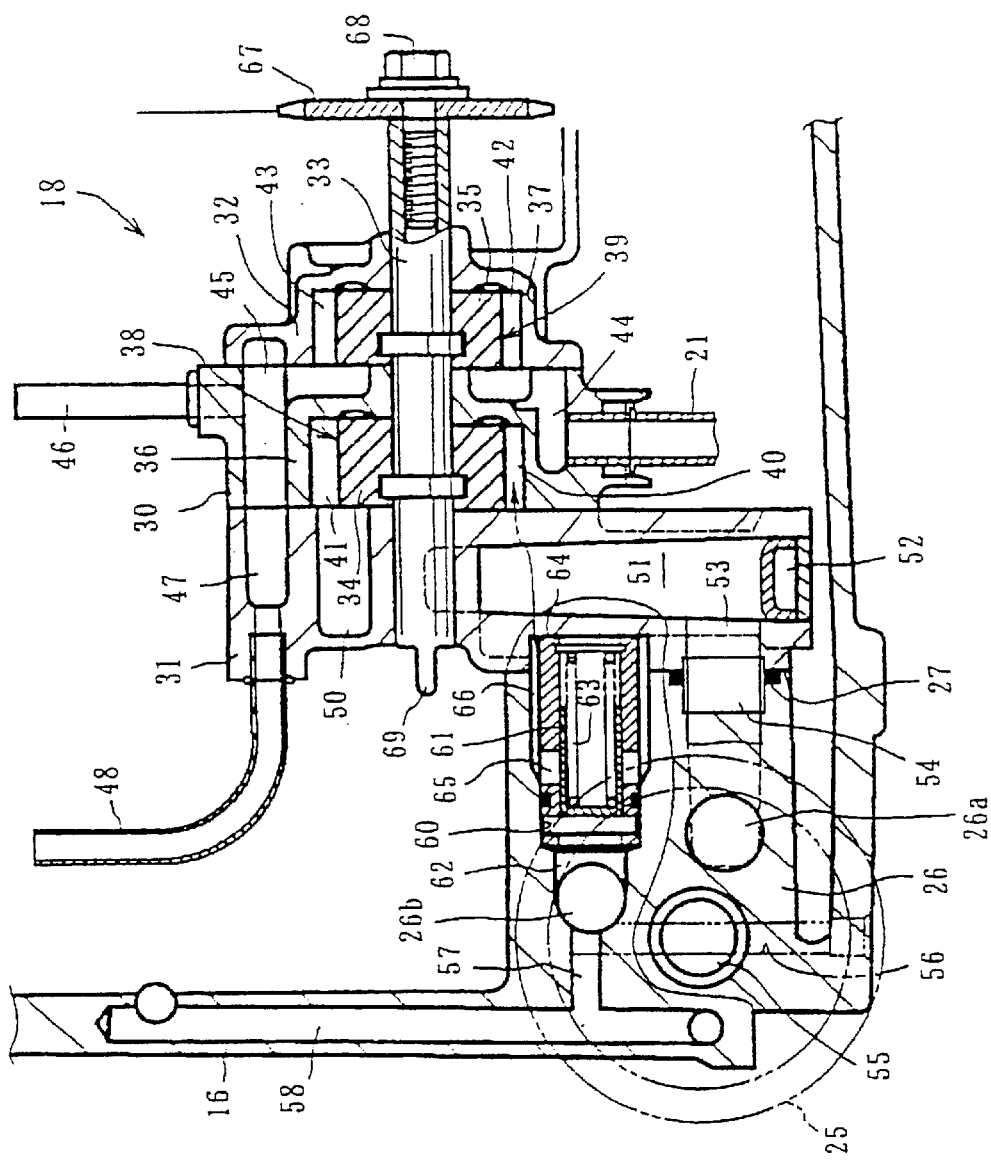
FIG. 2 is a sectional view of essential portions taken along a line 2—2 of FIG. 1.
Figure 3:
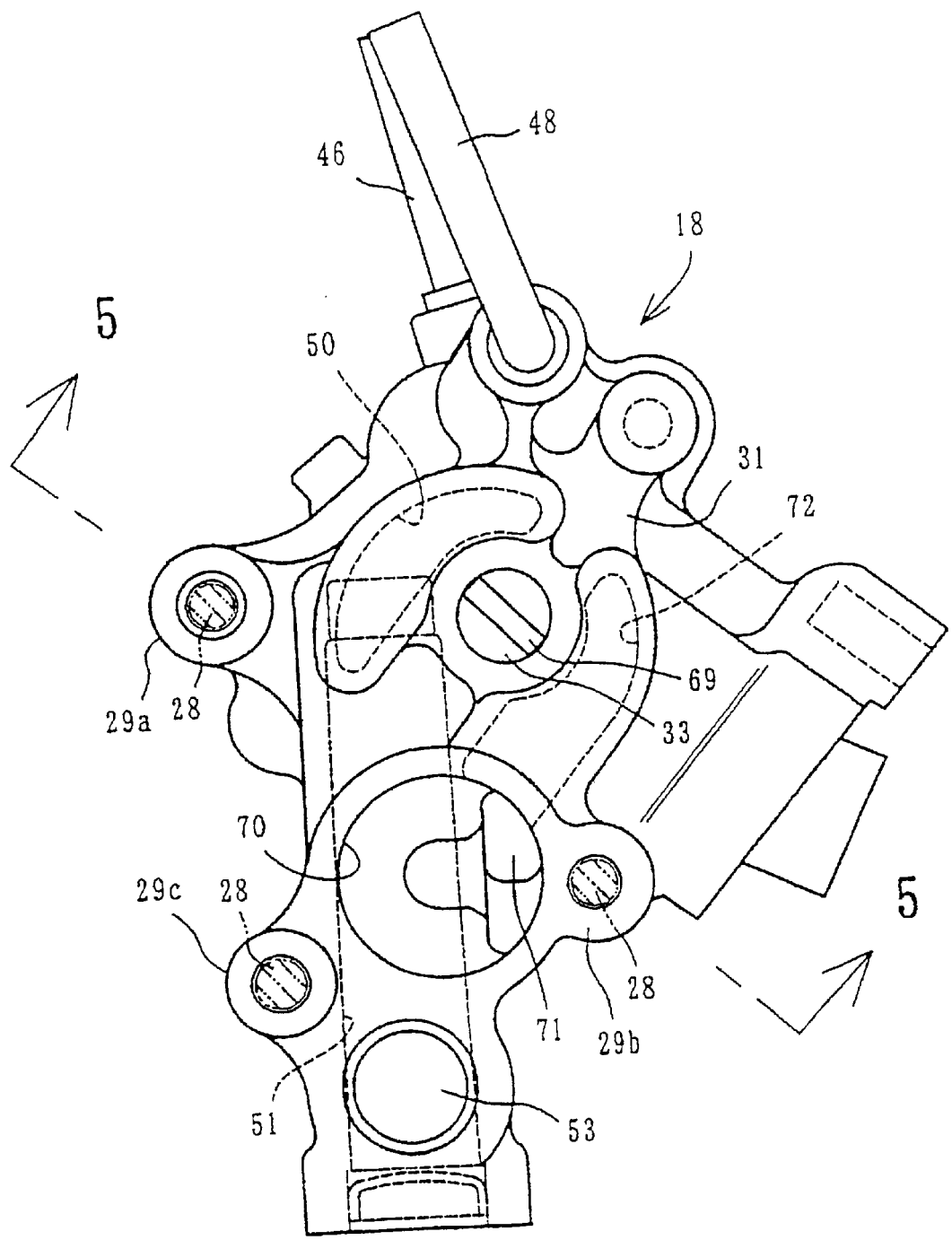
FIG. 3 is an enlarged view of an oil pump shown from the same direction as that of FIG. 1.

The oil pump 18 is mounted to a thick-walled portion 26 provided at a corner portion of the crankcase 16 as shown by FIG. 2 by a bonding face 27 and attached thereto at three locations of bosses 29a, 29b and 29c by three bolts 28 shown by FIG. 3. Two of the bolts are used for integrating the oil pump 18. That is, when the bosses 29a and 29b are attached thereto by respectively using the bolts 28, a main body portion 30, a base 31 and a pump cover 32 constituting the oil pump 18 can be combined and integrated. Further, the three members are previously tacked and integrated by dowel pins.

Referring to FIG. 2, the oil pump 18 is formed by sandwiching two inner rotors 34 and 35 between both sides of the main body portion 30 and the base 31 and the pump cover 32 respectively, and by having a rotor rotational shaft 33 that penetrates these members. Inner rotor 34 is brought into mesh with an outer rotor 36 on a side of the main body portion 30, and, similarly, inner rotor 35 is brought into mesh with an outer rotor 37 on a side of the pump cover 32, thereby constituting a main pump 38 and a sub pump 39. Either of these constitutes a publicly-known trochoidal type pump.

The main pump 38 is provided with a pumping portion 40 on a lower pressure side connected to the strainer 20 and a delivering portion 41 on a higher pressure side. Further, the sub pump 39 is also provided with a pumping portion 42 on a lower pressure side and a delivering portion 43 on a higher pressure side. The pumping portion 42 is in communication with a suction port 44 of the main body portion 30 to which the suction tube 21 is connected.

The delivering portion 43 is connected to a delivery path 45 provided at the main body portion 30. The delivery path 45 supplies the lubricating oil to a side of the main shaft 12 by way of a delivery tube 46 extending from a top portion to the side of the main shaft 12. Further, the delivery path 45 supplies the lubricating oil to the side of the main shaft 12 from a delivery tube 48 similarly extending from the base 31 and directed to the side of the main shaft 12 by way of a delivery path 47 formed at the base 31. The base 31 communicates with a delivering portion 50 communicating with the delivering portion 41 of the main pump 38, and the delivering portion 50 communicates with a main delivery path 51 projecting to the lower side of the base 31, as shown in FIG. 2.

A lower end of the main delivery path 51 is closed by a cap seal 52. The lubricating oil passes through a communication path 54 formed substantially in parallel with the rotor rotational shaft 33 from an opening 53 provided in the vicinity of the cap seal 52 and into the thick-walled portion 26 of the crankcase 16. The lubricating oil is then delivered into the oil filter 25 by passing through an inlet path 26a formed in the orthogonal direction.

The lubricating oil which has been filtered in the oil filter 25, passes through a path 55 formed in the thick-walled portion 26 in a direction axially orthogonal to the rotor rotational shaft 33 and is delivered to a main gallery. Further provided is a relief path 56 formed at a face of the oil filter 25 and bonded with an outer side face of the thick-walled portion 26 in the up and down direction. The relief path 56 has an upper end which communicates with a relief hole 26b formed in the thick-walled portion 26 in parallel with the path 55. The relief hole 26b communicates with an oil path 58 formed in a wall-thickness portion of the crankcase 16 in the up and down direction via a cross path 57, and communicates with a relief valve chamber 60 via a communicating portion 62.

The relief valve chamber 60 is formed from the thick-walled portion 26 over to the base 31 in parallel with the rotor rotational shaft 33. A relief valve 61 contained inside the relief valve chamber also has its axis parallel to the axis of the rotor rotational shaft 33, and is urged by a spring 63 in a direction of closing the communicating portion 62 for communicating with the cross path 57. The relief valve 61 can be slidably moved inside of a cylinder 64 inserted into the relief valve chamber 60. Further, an opening 65 is provided at a side portion of the cylinder 64, and a surrounding space 66 is formed on an outer side of the cylinder 64.

The opening 65 is normally closed by the relief valve 61, and only opens when the relief valve 61 is moved to the right side against the spring 63. When opening 65 is thus exposed, the relief valve 61 communicates between the inside of the cylinder 64 and the surrounding space 66. The surrounding space 66 is directly connected to the pumping portion 40 of the main body portion 30.

Therefore, when pressure of the communicating portion 62 communicating with the relief path 56 and the relief hole 26b becomes higher than a predetermined value, relief valve 61 is moved to the right side against the spring 63, thereby opening the opening 65 of the cylinder 64, and causing the lubricating oil under high pressure on the side of the communicating portion 62 to return from inside of the cylinder 64 to the pumping portion 40 via the opening 65 and the surrounding space 66.

Further, a sprocket 67 is attached to one end of the rotor rotational shaft 33 by a bolt 68 and is driven by way of a chain which is formed to wrap around a sprocket (not illustrated) on the main shaft 12. Further, a flat projection 69 is formed at the other end of the rotor rotational shaft 33, and the rotor rotational shaft 33 is coaxially connected with a drive shaft of a water pump, not illustrated, at the projection 69.

FIG. 3 shows an enlarged view of the oil pump 18 in a direction which is the same as the direction of FIG. 1. A cylindrical recess portion 70 is formed at the bottom of the relief valve chamber on the side of the base 31. Similarly, a through hole 71 is formed for communicating with a bottom portion of the pumping portion 40. Further, a pumping portion 72 communicating with the pumping portion 40 is formed at the base 31.

Figure 4:
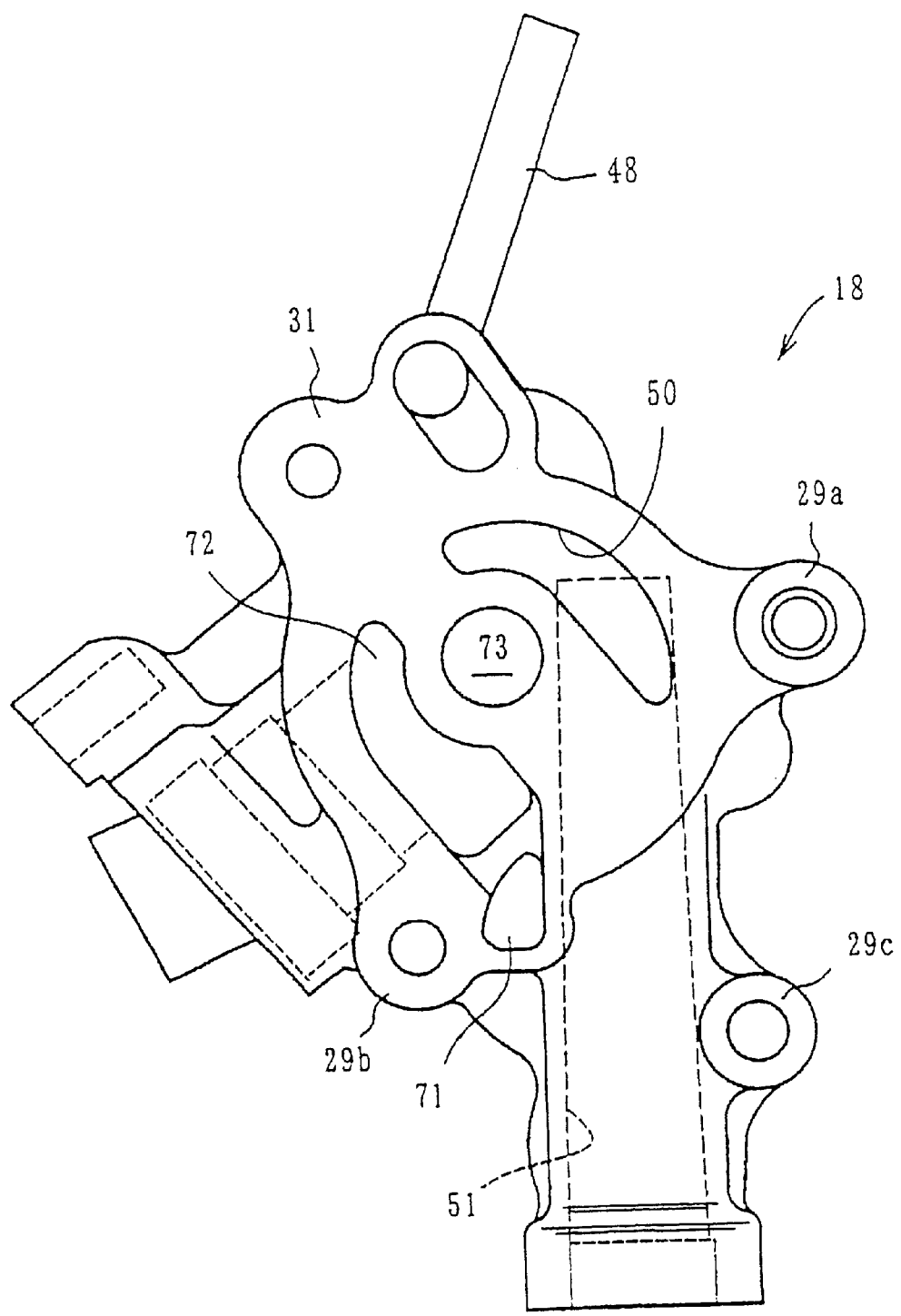
FIG. 4 is a view showing a base of the oil pump from a direction opposed to that of FIG. 3.
Figure 5:
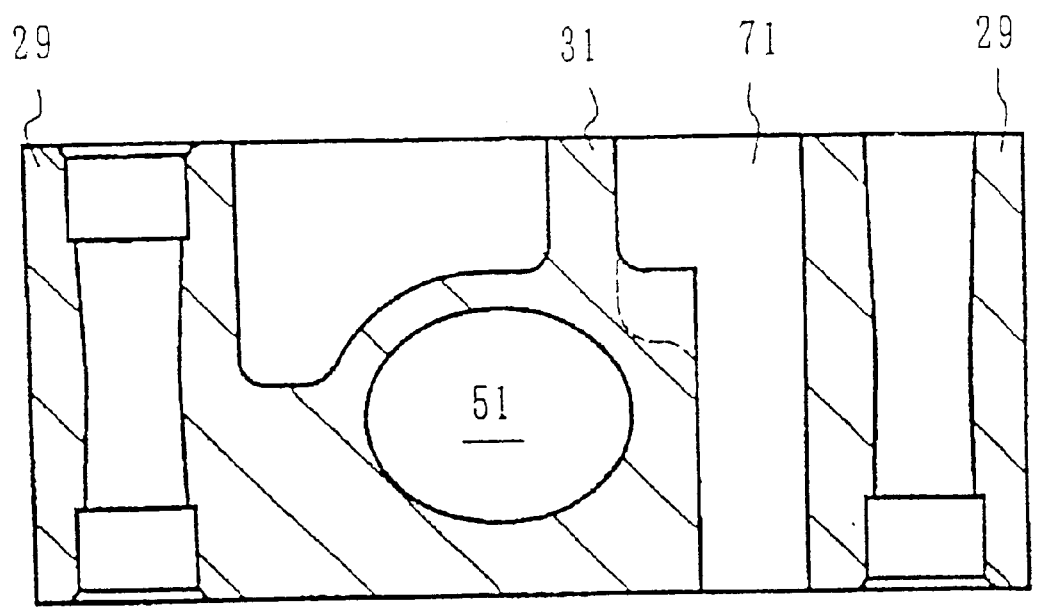
FIG. 5 is sectional view taken along a line 5—5 of FIG. 3.

As shown by FIG. 4, a rotor shaft hole 73 for passing the rotor rotational shaft 33 is sandwiched between the delivering portion 50 and the communicating groove 72 at a face of the base 31 and is bonded with the main body portion 30. Here, the communicating groove 72 is directly connected to the through hole 71. In reference to FIG. 5, the through hole 71 is formed to penetrate the wall thickness of the base 31 to communicate with the pumping portion 40 of the main body portion 30.

Next, an explanation of the operation of the embodiment will be given. When the oil pump 18 is provided as shown by FIG. 2, the lubricating oil is pumped from the oil pan 17 provided at the bottom portion of the crankcase 16 to the pumping portion 40 via the strainer 20. There the lubricating oil is pressurized by the main pump 38, delivered from the delivering portion 41 to the oil filter 25 via the delivering portion 50 and the main delivery path 51, where it is cleaned and supplied to the respective portions of the engine. Further, the sub pump 39 also pumps the lubricating oil from the suction tube 21 to the pumping portion 42 via the suction inlet 44. There the lubricating oil is pressurized, passes through the delivery path 45 from the delivering portion 43, and is supplied from the suction tubes 46 and 48 to the respective portions of the engine.

When oil pressure at the main delivery path 51 becomes higher than a predetermined value, the high pressure oil enters from the path 56 and the cross path 57 to the communicating portion 62 and moves the relief valve 61 against the spring 63. This causes the opening 65 to open and to communicate the inside of the cylinder 64 with the surrounding space 66. As a result, the high pressure oil is returned from the surrounding space 66 to the pumping portion 40 via the through hole 71 and the communicating groove 72, where it is pressurized and circulated by the main pump 38 again.

In this way, the surrounding space 66 is directly connected to the pumping portion 40 of the main body portion 30 via the through hole 71 and the communicating groove 72 provided at the base 31. This makes it possible for the relief path to be relatively short. This also makes it possible for the total structure of the oil pump to be small in size and light in weight. This structure also promotes pump efficiency, since the lubricating oil at high pressure escapes directly into the pumping portion 40.

Further, as shown by FIG. 2, the oil pump 18 is assembled by integrating the main body portion 30, the base 31 and the pump cover 32, and bonding the integrated unit to a wall face of the thick-walled portion 26 facing inside of the crankcase 16, wherein the bosses 29a, 29b and 29c are attached by using the bolts 28. The relief valve 61 previously contained in the relief valve chamber 60 of the thick-walled portion 26, is then positioned by being sandwiched between the oil pump 18 and the thick-walled portion 26. Thus, relief valve 61 can be positioned conveniently and in a small space, without interfering with other parts in the crankcase.

Moreover, the relief valve chamber 60 and the relief valve 61 are provided in a direction axially and parallel to the axis of the rotor rotational shaft 33, allowing the relief valve chamber 60 to be formed inside of the thick-walled portion 26, without extending into a space inside of the crankcase 16, which would make layout difficult. Thus, the present invention achieves a layout for the relief valve that promotes the efficient use of space.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An oil pump structure of an engine for receiving, pressurizing, and supplying a lubricating oil to the engine, wherein the oil pump structure is bonded to a crankcase of the engine, said oil pump structure comprising:
   a main body portion, a base juxtaposed adjacent to one side of the main body portion, and a pump cover juxtaposed adjacent to another side of the main body portion;
   a relief valve for adjusting a delivery pressure of the lubricating oil;
   a relief valve chamber formed in a space between the crankcase and an oil pump, said relief valve chamber having an axis substantially parallel to an axis of a rotor rotational shaft; and
   a relief path from a relief valve formed by directly connecting the relief valve chamber and an intake chamber of the oil pump contiguous thereto.

2. The oil pump structure according to claim 1, wherein the oil pump is formed by integrating the main body portion, the base, and the pump cover and sandwiching both sides of the main body portion between the base and the pump cover.

3. The oil pump structure according to claim 2, wherein the main body portion, the base, and the pump cover are previously combined and integrated and then attached to a thick wall portion of a crankcase by three bolts.

4. The oil pump structure according to claim 1, wherein a first inner rotor is provided on an inner side of the main body portion, and a second inner rotor is provided on an outer side of the main body portion, and a rotor rotational shaft penetrates the main body portion, the base and the cover, and wherein the first inner rotor on the inner side of the main body portion meshes with a first outer rotor, and the second inner rotor on the outer side of the main body portion meshes with a second outer rotor to form a main pump and a sub pump.

5. The oil pump structure according to claim 1, wherein the relief valve chamber is interposed between the crankcase and the oil pump, and is formed by utilizing an inside wall thickness of the crankcase.

6. The oil pump structure according to claim 1, wherein a cylinder is inserted into the relief valve chamber, wherein an oil pressure becomes higher than a predetermined level, the relief valve is slidably moved to the right within the cylinder, and exposes an opening for communicating the inside of the cylinder to a surrounding space formed on an outer side of the cylinder.

7. The oil pump structure according to claim 6, wherein the surrounding space formed on the outer side of the cylinder is directly connected to the pumping portion of the main body portion via a through hole and a communicating groove provided at the base for providing a relatively short relief path.

8. An oil pump structure of an engine for receiving, pressurizing, and supplying a lubricating oil to the engine, wherein the oil pump structure is bonded to a crankcase of the engine, said oil pump structure comprising:
   a main body portion, a base juxtaposed adjacent to one side of the main body portion, and a pump cover juxtaposed adjacent to another side of the main body portion;
   a rotor rotational shaft having an axis substantially parallel to an axis of a main shaft of the engine;
   a relief valve for adjusting a delivery pressure of the lubricating oil;
   a relief valve chamber formed in a space between the crankcase and an oil pump, said relief valve chamber having an axis substantially parallel to the axis of the rotor rotational shaft; and
   a relief path from a relief valve formed by directly connecting the relief valve chamber and an intake chamber of the oil pump contiguous thereto.

9. The oil pump structure according to claim 8, wherein the oil pump is formed by integrating the main body portion, the base, and the pump cover and sandwiching both sides of the main body portion between the base and the pump cover.

10. The oil pump structure according to claim 9, wherein the main body portion, the base, and the pump cover are previously combined and integrated and then attached to a thick wall portion of a crankcase by three bolts.

11. The oil pump structure according to claim 8, wherein a first inner rotor is provided on an inner side of the main body portion, and a second inner rotor is provided on an outer side of the main body portion, and a rotor rotational shaft penetrates the main body portion, the base and the cover, and wherein the first inner rotor on the inner side of the main body portion meshes with a first outer rotor, and the second inner rotor on the outer side of the main body portion meshes with a second outer rotor to form a main pump and a sub pump.

12. The oil pump structure according to claim 8, wherein the relief valve chamber is interposed between the crankcase and the oil pump, and is formed by utilizing an inside wall thickness of the crankcase.

13. The oil pump structure according to claim 8, wherein a cylinder is inserted into the relief valve chamber, wherein an oil pressure becomes higher than a predetermined level, the relief valve is slidably moved to the right within the cylinder, and exposes an opening for communicating the inside of the cylinder to a surrounding space formed on an outer side of the cylinder.

14. The oil pump structure according to claim 13, wherein the surrounding space formed on the outer side of the cylinder is directly connected to the pumping portion of the main body portion via a through hole and a communicating groove provided at the base for providing a relatively short relief path.

* * * * *